US010269058B2

(12) United States Patent
Bhogal et al.

(10) Patent No.: US 10,269,058 B2
(45) Date of Patent: Apr. 23, 2019

(54) SIMULATING PHYSICS IN A USER INTERFACE

(71) Applicant: PATH MOBILE INC PTE. LTD., Singapore (SG)

(72) Inventors: Nikhil Bhogal, San Francisco, CA (US); Yigit Boyar, San Francisco, CA (US); Edward Scherf, Sunnyvale, CA (US); Cynthia Samanian, San Francisco, CA (US)

(73) Assignee: PATH MOBILE INC PTE. LTD., Singapore (SG)

( * ) Notice: Subject to any disclaimer, the term of this patent is extended or adjusted under 35 U.S.C. 154(b) by 1196 days.

(21) Appl. No.: 14/185,883

(22) Filed: Feb. 20, 2014

(65) Prior Publication Data

US 2014/0236777 A1    Aug. 21, 2014

Related U.S. Application Data

(60) Provisional application No. 61/767,134, filed on Feb. 20, 2013.

(51) Int. Cl.
| | | |
|---|---|---|
| *G06Q 30/06* | (2012.01) | |
| *G06F 3/0484* | (2013.01) | |
| *G06F 1/16* | (2006.01) | |
| *G06F 3/0481* | (2013.01) | |

(52) U.S. Cl.
CPC ....... *G06Q 30/0643* (2013.01); *G06F 1/1694* (2013.01); *G06F 3/0481* (2013.01); *G06F 3/04817* (2013.01); *G06F 3/04842* (2013.01)

(58) Field of Classification Search
CPC .......................................... G06Q 30/06–30/08

USPC .................................................. 705/26.1–27.2
See application file for complete search history.

(56) References Cited

U.S. PATENT DOCUMENTS

| | | |
|---|---|---|
| D398,001 S | 9/1998 | Bohnert et al. |
| 6,088,032 A | 7/2000 | Mackinlay |
| D434,421 S | 11/2000 | Hanley et al. |
| D457,890 S | 5/2002 | Chaudhri et al. |
| 6,570,597 B1 | 5/2003 | Seki et al. |
| D498,763 S | 11/2004 | Totten et al. |
| D511,172 S | 11/2005 | Totten et al. |
| 7,178,110 B2 | 2/2007 | Fujino |
| D545,834 S | 7/2007 | Anthony et al. |
| D545,835 S | 7/2007 | Anthony et al. |
| D546,343 S | 7/2007 | Anthony et al. |
| D551,677 S | 9/2007 | Pieratt et al. |
| D552,620 S | 10/2007 | Sato et al. |
| D554,144 S | 10/2007 | Hally et al. |
| D555,663 S | 11/2007 | Nagata et al. |
| D559,855 S | 1/2008 | Sato et al. |
| D559,858 S | 1/2008 | Gusmorino et al. |

(Continued)

OTHER PUBLICATIONS

Improving Accuracy through Averaging, no author given, Sep. 6, 2006, available at http://www.ni.com/white-paper/3488/en/.*

*Primary Examiner* — Ming Shui
(74) *Attorney, Agent, or Firm* — Cantor Colburn LLP

(57) ABSTRACT

A virtual shop application operating on a user device presents a virtual shop of a social networking system. The virtual shop displays a set of virtual goods/items available for purchase by users. Sensor information is captured by one or more sensors based on movement of the user device. Based on the sensor information, the displayed virtual goods are each oriented with respect to a stationary point.

21 Claims, 6 Drawing Sheets

(56) References Cited

U.S. PATENT DOCUMENTS

| | | |
|---|---|---|
| D563,424 S | 3/2008 | Gusmorino et al. |
| D568,892 S | 5/2008 | Stabb et al. |
| D573,156 S | 7/2008 | Gusmorino et al. |
| D594,021 S | 6/2009 | Ball et al. |
| D594,025 S | 6/2009 | Ball et al. |
| D594,026 S | 6/2009 | Ball et al. |
| D596,190 S | 7/2009 | Garcia |
| D598,466 S | 8/2009 | Hirsch et al. |
| D598,928 S | 8/2009 | Hirsch et al. |
| D599,370 S | 9/2009 | Murchie et al. |
| D599,811 S | 9/2009 | Watanabe et al. |
| D599,812 S | 9/2009 | Hirsch |
| D599,817 S | 9/2009 | Mays |
| D601,170 S | 9/2009 | Pell et al. |
| D605,200 S | 12/2009 | Sakai |
| 7,667,703 B2 | 2/2010 | Hong et al. |
| D611,486 S | 3/2010 | Hirsch et al. |
| D611,496 S | 3/2010 | Akiyoshi et al. |
| D612,389 S | 3/2010 | Garcia |
| D615,552 S | 5/2010 | Baugher et al. |
| D616,450 S | 5/2010 | Simons et al. |
| D624,558 S | 9/2010 | Barcheck et al. |
| D624,932 S | 10/2010 | Chaudhri |
| D624,935 S | 10/2010 | Umezawa |
| D627,361 S | 11/2010 | Lew et al. |
| D628,210 S | 11/2010 | Luke et al. |
| D628,593 S | 12/2010 | O'Donnell et al. |
| D629,010 S | 12/2010 | O'Donnell et al. |
| D633,523 S | 3/2011 | Trabona et al. |
| D633,920 S | 3/2011 | Luke et al. |
| 7,898,541 B2 | 3/2011 | Hong et al. |
| D637,198 S | 5/2011 | Furuya et al. |
| D637,606 S | 5/2011 | Luke et al. |
| 7,954,066 B2 | 5/2011 | Simister et al. |
| D640,272 S | 6/2011 | Arnold et al. |
| D642,193 S | 7/2011 | Shih et al. |
| D645,872 S | 9/2011 | Smith |
| 8,024,658 B1 | 9/2011 | Fagans et al. |
| D648,345 S | 11/2011 | Arnold et al. |
| D650,799 S | 12/2011 | Wantland et al. |
| D658,195 S | 4/2012 | Cranfill |
| D663,311 S | 7/2012 | David et al. |
| D663,312 S | 7/2012 | David et al. |
| D663,314 S | 7/2012 | David et al. |
| D663,740 S | 7/2012 | Gleasman et al. |
| D664,552 S | 7/2012 | Gleasman et al. |
| D664,553 S | 7/2012 | Gleasman et al. |
| D669,091 S | 10/2012 | Cranfill |
| D673,974 S | 1/2013 | Sepulveda |
| D675,638 S | 2/2013 | Woo et al. |
| D682,262 S | 5/2013 | Akana et al. |
| D682,851 S | 5/2013 | Kwon et al. |
| D683,345 S | 5/2013 | Akana et al. |
| D687,446 S | 8/2013 | Arnold et al. |
| D687,448 S | 8/2013 | Arnold et al. |
| D687,840 S | 8/2013 | Arnold et al. |
| D689,060 S | 9/2013 | Tamura et al. |
| 8,543,910 B2 | 9/2013 | Redpath |
| D692,919 S | 11/2013 | Ridl et al. |
| D694,779 S | 12/2013 | Kocmick et al. |
| D696,685 S | 12/2013 | Bae et al. |
| D697,527 S | 1/2014 | Lee et al. |
| D697,934 S | 1/2014 | Lee et al. |
| D699,258 S | 2/2014 | Jong et al. |
| D700,209 S | 2/2014 | Tanghe et al. |
| D701,230 S | 3/2014 | Lee |
| D701,503 S | 3/2014 | Akana et al. |
| D701,527 S | 3/2014 | Brinda et al. |
| D706,810 S | 6/2014 | Jones et al. |
| D707,235 S | 6/2014 | Arnold et al. |
| D707,249 S | 6/2014 | Yamada |
| D711,922 S | 8/2014 | Dellinger |
| D712,426 S | 9/2014 | Morisada et al. |
| D712,432 S | 9/2014 | Chaudhri |
| D715,831 S | 10/2014 | Kim |
| D717,312 S | 11/2014 | Matas et al. |
| D717,326 S | 11/2014 | Kim |
| D721,381 S | 1/2015 | Pereira |
| 2003/0052900 A1 | 3/2003 | Card et al. |
| 2005/0102610 A1 | 5/2005 | Jie |
| 2006/0107207 A1 | 5/2006 | Wada |
| 2009/0012846 A1 | 1/2009 | Ertell et al. |
| 2009/0288028 A1 | 11/2009 | Gohda et al. |
| 2010/0125816 A1* | 5/2010 | Bezos .................. G06F 1/1626 |
| | | 715/863 |
| 2012/0050789 A1 | 3/2012 | Bachman et al. |
| 2012/0089947 A1 | 4/2012 | Lee et al. |
| 2014/0095349 A1* | 4/2014 | Mabrey .............. G06Q 30/0643 |
| | | 705/26.8 |

* cited by examiner

SIMULATING PHYSICS IN A USER INTERFACE

CROSS-REFERENCE TO RELATED APPLICATIONS

This application claims the benefit of U.S. provisional application 61/767,134, filed on Feb. 20, 2013, which is incorporated by reference herein in its entirety.

BACKGROUND

1. Field of Art

The disclosure generally relates to user interfaces, and more specifically to simulating physics in a user interface.

2. Description of the Related Art

Social networking systems are pervasive with users today. In some instances, social networking systems enable users to purchase virtual goods for use with the social networking systems. For example, a user of a social networking system may be permitted to purchase a virtual badge or other virtual good. Currently, social networking systems exhibit virtual goods for sale in a non-interactive fashion. For example, social networking systems often display virtual goods as static images. As a consequence, users generally have relatively poor experiences when shopping for virtual goods over social networking systems.

BRIEF SUMMARY

Embodiments of a disclosed system, method and computer readable storage medium include simulating physics in a user interface. A virtual shop application operating on a user device presents a virtual shop of a social networking system. The virtual shop displays a set of virtual goods/items available for purchase by users. Sensor information is captured by one or more sensors based on movement of the user device. Based on the sensor information, the displayed virtual goods are each oriented (e.g., rotated) with respect to a stationary point.

The figures depict an embodiment for purposes of illustration only. One skilled in the art will readily recognize from the following description that alternative embodiments of the structures and methods illustrated herein may be employed without departing from the principles described herein.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Embodiments of a disclosed system, method and computer readable storage medium include simulating physics in a user interface. In one embodiment, the user interface represents a virtual shop of a social networking system. The virtual shop may be presented by a virtual shop application executed by a user device. The virtual shop displays a set of virtual goods/items that may be purchased by users. Physics are simulated with respect to the displayed virtual goods using sensor information. Specifically, sensor information for the user device is captured using one or more sensors. Based on the sensor information, the displayed virtual goods are each oriented with respect to a stationary point.

As a specific example, a set of virtual goods may be presented as hanging on different virtual hooks within the virtual shop. As sensor information for the user device is captured by one or more internal sensors of the user device, the virtual goods are rotated, using the sensor information, in real-time or substantial real-time around the virtual hooks. In rotating the virtual goods around the virtual hooks based on the sensor information, the effects of physical phenomenons (e.g., gravity) for the virtual goods may be simulated. Illustratively, the virtual goods may swing or rotate back and forth relative to an x-y plane with respect to the virtual hooks. The virtual goods may also be oriented such that the virtual goods are perpendicular with respect to the ground even where the user device is tilted with respect to the ground. By simulating the physics of virtual goods in a virtual shop, user interactions with the virtual shop can be improved and user experiences enhanced. As a result, usage of and revenue generated from the virtual shop may be increased. Further, in devices that can display three-dimensions, the principles described herein may also apply to a x-z plane and/or y-z plane in addition to the x-y plane.

Computing Machine Architecture

Figure 1:
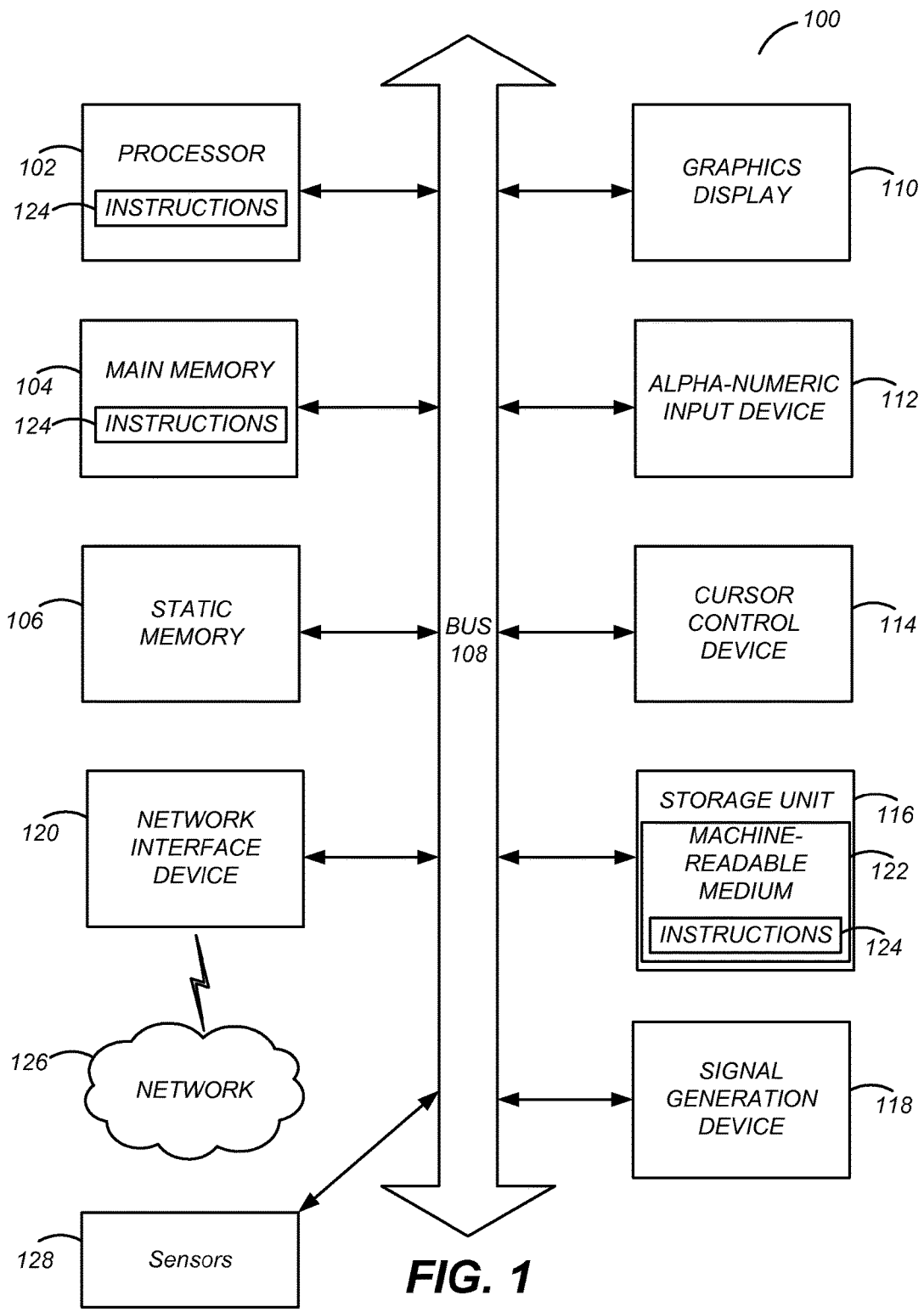
FIG. 1 illustrates one embodiment of components of an example machine able to read instructions from a machine-readable medium and execute them in a processor (or controller).

The disclosed software structures and processes are configured for operation on a machine, e.g., a computing system. FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a mobile computing devices such as a tablet computer, an ultrabook (or netbook) computer, a personal digital assistant (PDA), a cellular telephone, a smartphone, a web appliance, or like machine capable of executing instructions 124 (sequential or otherwise) that specify actions to be taken by that machine.

Further, while only a single machine is illustrated, the term "machine" shall also be taken to include any collection of machines that individually or jointly execute instructions 124 to perform any one or more of the methodologies discussed herein.

The example computer system 100 includes one or more processors 102 (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 100 also includes a main memory 104 and a static memory 106. The components of the computing system are configured to communicate with each other via a bus 108. The computer system 100 may further include a graphics display unit 110 (e.g., a plasma display panel (PDP), a liquid crystal display (LCD)) which may be configured for capacitive or inductive touch sensitivity to allow for direct interaction with software user interfaces through the display 110. The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a non-transitory machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 via the network interface device 120.

The computer system 100 may also include sensors 128 that detect incidents occurring with respect to the computer system 100 and responsively generates sensor information based on the detected incidents. A sensor 128 may be any suitable type of sensor, such as an accelerometer, gyroscope, proximity sensor, a GPS module, etc. For example, a sensor 128 may be an accelerometer configured to detect changes in the velocity (i.e. acceleration) of the computer system 100. The sensor information generated by the accelerometer may include the acceleration of the computer system 100 with respect to an x-axis, y axis, and z axis.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

System Architecture

Figure 2:
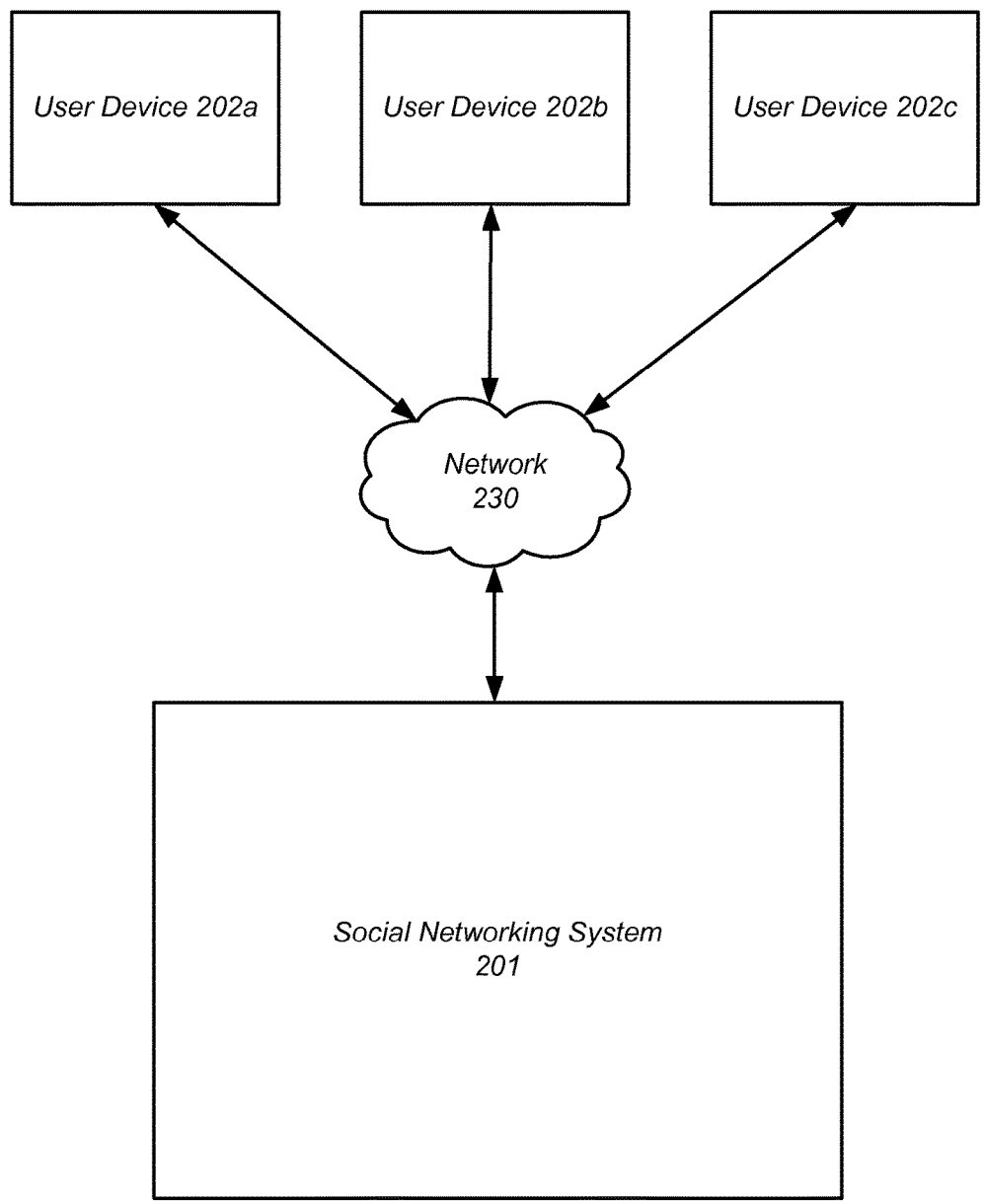
FIG. 2 illustrates one embodiment of a system environment suitable for operation of a social networking system.

Referring now to FIG. 2, it is a high-level diagram illustrating a typical environment 200 used for simulating physics in a virtual shop according to one embodiment. As shown in FIG. 2, the environment 200 includes a social networking system 201, user devices 202, and a network 230. Each of the user devices 202 and social networking system 201 may be in communication with one another via the network 230. Only one social networking system 201 and three user devices 202 are shown in FIG. 2 for purposes of clarity. However, those of skill in the art will recognize that typical environments can have thousands or millions of user devices 202, and can also have multiple social networking systems 201. Note that the user device 202 may be configured similar to the computer system 100.

The network 230 enables communications between the various entities of the environment 200. In one embodiment, the network 230 uses standard communications technologies and/or protocols. Thus, the network 230 can include links using technologies such as Ethernet, Wireless Fidelity (WiFi) (e.g., 802.11), worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 230 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 230 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 230 can also include links to other networks such as the Internet.

The user devices 202 are computing devices operated by users of the social networking system 201 to access functionalities of the social networking system 201. As noted, the user devices 202 may be any suitable computing devices, such as mobile phones, laptops, tablet devices, gaming consoles, personal digital assistants, desktop computers, automobiles, and/or the like as described in FIG. 1. In one aspect, the users of the user devices 202 may each have a user profile associated with the social networking system 201. The user profiles may include, for example, information about the users, content associated with the users (e.g., moments, pictures, and audio), etc. The users of the user devices 202 may additionally establish social network connections with other users of the social networking system. For example, a user may become a friend of another user of the social networking system.

In one aspect, the user devices 202 may include or be connected to one or more sensors 128. The sensors 128 may be usable for capturing sensor information for the user devices 202. In one aspect, the sensors 128 may include an accelerometer sensor, proximity sensor, and/or gyroscope sensor. The accelerometer sensor determines the acceleration of a user device over time. The proximity sensor determines the proximity of the user device to a particular object, such as a user's face. The gyroscope sensor provides information regarding the orientation of the user device.

Thus, the sensor information includes at least acceleration information for the user device, proximity information of the user device, and/or orientation information for the user device. In one embodiment, a virtual shop application executed by a user device 202 uses sensor information to simulate the physics of virtual goods within a virtual shop of the virtual shop application executed by the user device 202.

The social networking system 201 maintains a set of established connections between users of the user devices 202. For example, the social networking system 201 may maintain a set of connections for a user indicating other users of the social networking system 201 with whom the user is friends. The social networking system 201 additionally enables the users of the user devices 202 to communicate with one another. In particular, the social networking system 201 enables those users that have established social network connections to one another to communicate. In this way, the social networking system 201 enables users to control their communication to only a certain group users (i.e., to a closed and personal social network). The social networking system 201 may further store the user profiles for the users.

In one embodiment, the social networking system 201 is associated with a virtual shop for selling virtual goods. The virtual goods may be purchased by a user of the social networking system 201 via a virtual shop application executed by a user device 202 of the user. The virtual goods may also be purchased through a mobile application or user interface (e.g., web interface) provided by the social networking system 201. Following purchase of the virtual good, the social networking system 201 associates the virtual good with a profile of the user. Thereafter, the user may use the virtual good in any number of ways. For example, the user may display the virtual good on a profile of the user (e.g., as a virtual sticker, badge, etc.), associate the virtual good with another user (e.g., provide as a gift), use the virtual good to access various functionalities of the social networking system 201 (e.g., allow a filter to be applied to an image associated with the user), etc.

It will be appreciated, that in other embodiments, the social networking system 201 may perform any of the functionalities of the user devices 202 described herein. For example, the social networking system 201, rather than the user devices 202, may use sensor information to determine the effect of physical phenomenon on virtual goods displayed by the user devices 202.

Example Processing Overview

Figure 3:
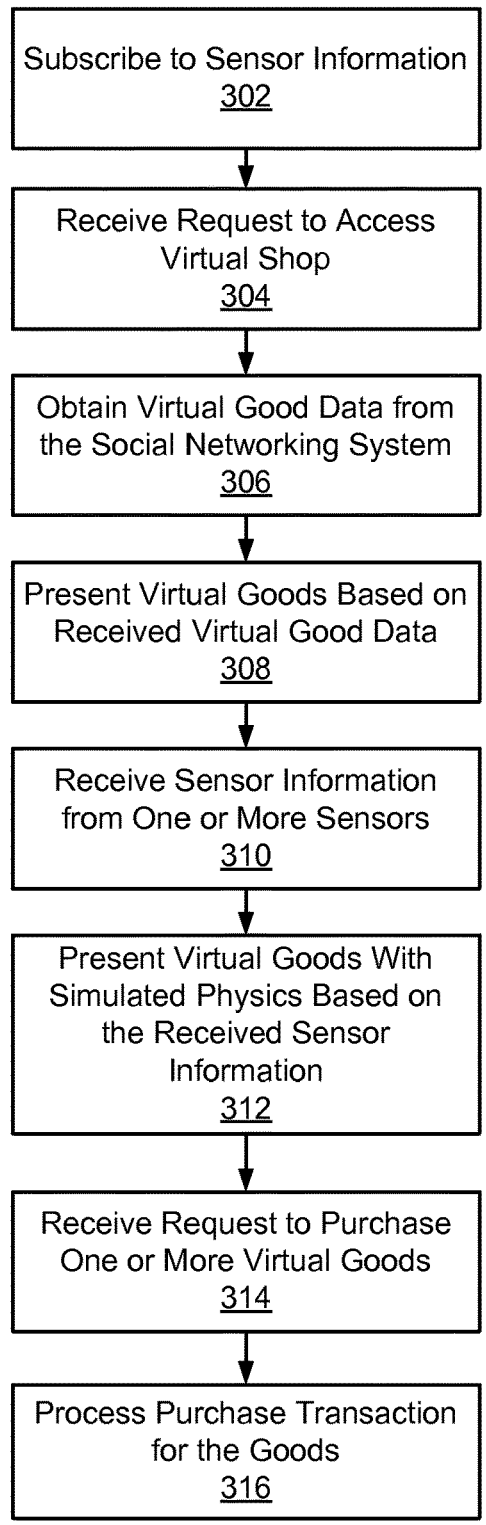
FIG. 3 illustrates one example embodiment of a process for simulating physics in a graphical user interface.

FIG. 3 is a flowchart illustrating an example process for simulating physics in a graphical user interface according to one embodiment. Other embodiments can perform the steps of the method in different orders and can include different, additional and/or fewer steps. Likewise, multiple instances of the steps may be performed in parallel.

The method begins with a virtual shop application associated with the social networking system 201 and executed by a user device 202 subscribing 302 to sensor information from one or more sensors. The sensors may be embedded in or otherwise connected to the user device 202. By subscribing to the sensor information, when a change associated with the user device 202 is detected (e.g., a change in the velocity of the user device 202), the virtual shop application receives the sensor information from the sensors.

Thereafter, the virtual shop application receives 304 a request from a user of the user device 202 to access a virtual shop of the virtual shop application. In response to the request, the virtual shop application obtains 306 virtual good data from the social networking system 201. In particular, the virtual shop application sends a request for virtual good data to the social networking system 201. The request may include a unique identifier of the user, such as a username or user code. The identifier may enable the social networking system 201 to identify the user and/or a user profile of the user.

In response to the request, the virtual shop application receives the virtual good data from the social networking system 201. The virtual good data may include information regarding virtual goods that the social networking system 201 has available for purchase. The virtual goods for which the system 201 provides data may be personalized for the user. For example, the virtual goods may be selected based on the user's preferences or goods the user has previously purchased.

Based on the virtual good data, the virtual shop application presents 308 one or more virtual goods to the user of the user device 202 via a display of the user device 202. In one embodiment, each virtual good may be associated with a label and/or various icons providing various types of information about the virtual good. For example, the labels and/or icons may indicate the name of the virtual good, whether the user of the user device 202 owns or has previously purchased the virtual good, and/or the like.

In one embodiment, the virtual shop application receives 310 sensor information from one or more sensors and presents 312 the one or more virtual goods to the user via the display based on sensor information. Specifically, the virtual shop application orientates the virtual goods with respect to a set of orientation points on the display of the user device 202 using the sensor information. In particular, each virtual good may be associated with a different orientation point having a specific set of coordinates associated with the display. During operation, the virtual shop application rotates the virtual good with respect to the orientation point responsive to sensor information received from the one or more sensors of the user device 202 to which the virtual shop application previously subscribed. In one aspect, the virtual shop application orientates the virtual goods based on the sensor information such that the effects of gravity and/or other physical phenomenon are simulated with respect to the virtual goods.

As an example, the orientation points may be associated with a set of fixed virtual hooks displayed on the user device 202. Each virtual good may be presented as "hanging" on a corresponding virtual hook. As sensor information is obtained from one or more sensors, the virtual shop application rotates each virtual good around the virtual hooks based on the sensor information. The rotation of the virtual shop may approximate the effects of gravity and/or other physical phenomenon on the virtual goods based on changes in the motion (e.g., acceleration) of the user device 202 described by the sensor information.

During operation, the virtual shop application may obtain several sets of sensor information from the one or more sensors over time. For example, the virtual shop application may receive sensor information at a rate of 60 HZ. The virtual application may responsively rotate the virtual goods using each set of sensor information. For example, the virtual shop application may rotate the virtual goods to a first set of positions responsive to sensor information received at a first time. The virtual shop application may then rotate the virtual goods to a second set of positions responsive to sensor information received at a second time. An effect of such updates is that the user device 202 displays each virtual good as "swinging" in response to changes in the motion of the user device 202.

Simulation of the effects of gravity and/or other physical phenomenon based on sensor information can be performed in any suitable manner. In one embodiment, the sensor information includes data regarding any detected changes to the velocity (i.e., acceleration) of the user device 202 with respect to an x axis, y axis, and/or z axis. The sensor information further includes both current and historical acceleration data for each axis. In particular, the sensor information may include one or more samples, where each sample indicates the acceleration of the user device 202 along the x axis, y axis, and/or z axis at different times. For example, the sensor information may include 1, 3, 5, 8, 13, 21, 34, 55, 89, or 144 samples taken at different times.

To simulate the effects of gravity and/or other physical phenomenon, the virtual shop application determines an acceleration value for the user device 202 along each of the x axis, y axis, and z axis. In one aspect, each acceleration value may indicate the change in velocity of the user device 202 along a corresponding axis. The acceleration value may be based on the various samples included in the sensor information. In particular, the virtual shop application may calculate the acceleration value for each axis by suitably averaging various samples with respect to each axis.

By averaging the various samples, the virtual shop application enables the acceleration values for each axis generated over time to exhibit a smooth pattern. In particular, to rotate the virtual goods over time, the virtual shop application generates and processes several sets of acceleration values based on different sets of sensor information received at different times. Thus, using a running average of various samples enables the rotation of the virtual goods over time to appear smooth. For example, a first acceleration value generated at a first time may be based on a set of samples from 1-10. A second subsequent acceleration value may be based on a set of samples from 2-11. Thus, even if the 11th sample indicates a large change in the velocity of the user device 202, the first acceleration value and the second acceleration value may not be extremely different. Thus, when simulating the rotation of a virtual good using the two values (e.g., orientating the virtual goods using the first acceleration value at a first time and then orientating the virtual goods using the second acceleration value at a second time), the motion of the virtual good can appear smooth and without "jittering" effects.

In one embodiment, the acceleration values of the user devices 202 for each of the axis may be a weighted average of the various samples included in the sensor information. More specifically, samples that were more recently captured may have greater weight in calculating the acceleration values. In this way, older samples may have less of an impact on the acceleration values. As a result, the virtual shop application can better simulate the current physical state of the presented virtual goods.

After calculating the acceleration values, the virtual shop application determines whether the velocity of the user device 202 has changed with respect to the various axes. In particular, the virtual shop application may determine that the user device 202 has changed velocity with respect to a particular axis if the acceleration value of the user device 202 is outside of an acceleration range. For example, the acceleration range may have a value between 0 and 0.001. An acceleration value of 0.00001 for a particular axis may indicate that the user device 202 has not changed velocity with respect to the particular axis. In contrast, if the acceleration value of the user device 202 for a particular axis is greater than 0.001, the virtual application shop determines that the user device 202 has changed velocity with respect to the particular axis. By determining whether a change in velocity has occurred in the manner described, sensor noise may be filtered.

If it is determined that the velocity of the user device 202 has changed with respect to a particular axis, the virtual shop application calculates an orientation angle for each virtual good of the user device 202 using the acceleration value for the axis. Any suitable algorithm for calculating an orientation angle based on an acceleration value of the user device 202 may be employed. Based on the calculated orientation angle for each virtual good, the user device 202 positions (e.g., rotates/tilts) the virtual goods with respect to their corresponding orientation points. In one embodiment, the orientation angle for each virtual good differs based on the positioning of the virtual good on the display of the user device 202. For example, the orientation angle for virtual goods in outer columns may be automatically determined to be greater than the inner columns. As a result, the virtual goods situated in the outer columns may be tilted or rotated at a greater angle than the virtual goods situated in the inner columns.

After presenting the virtual goods, the virtual shop application receives 314 an indication from the user to purchase one or more virtual goods. Responsive to the indication, the virtual shop application processes 316 a purchase transaction for the goods. For example, the virtual shop application may prompt the user for payment information, such as credit card information, home address information, a phone number, email addresses, etc. After the purchase transaction is completed, the virtual shop application may associate the virtual good with the user or a user profile of the user, associate the virtual good with another user or a user profile of the other user, etc. In one aspect, the label for the virtual good may be updated in the virtual shop to indicate that the user has purchased the virtual good. For example, the label corresponding to the virtual good may be updated to include a checkmark indicating that the user has purchased the virtual good.

Figure 4:
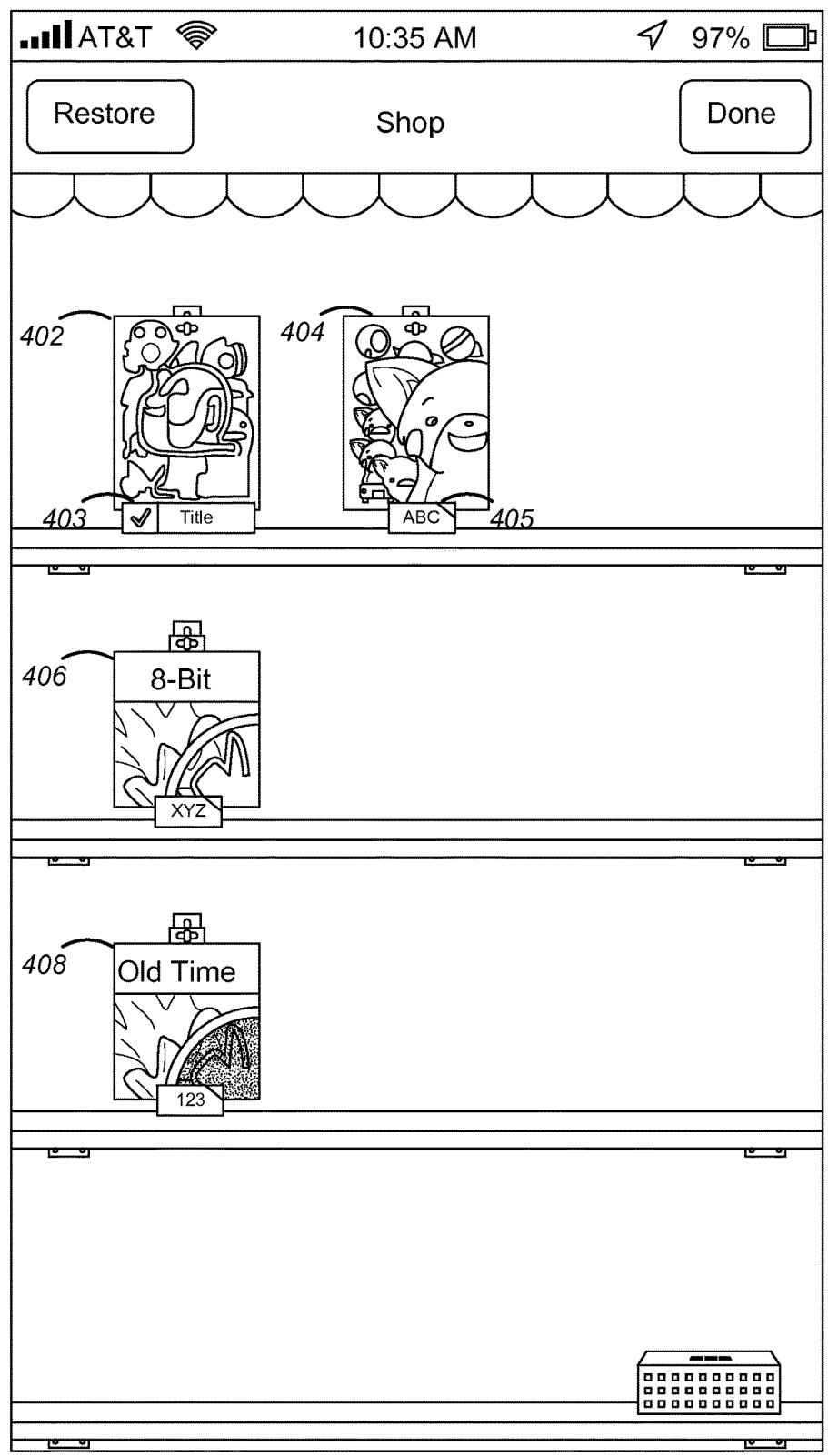
FIG. 4 illustrates one example embodiment of a graphical user interface.

Referring to FIG. 4, it shows an example graphical user interface according to one embodiment. In FIG. 4, four different virtual goods 402, 404, 406, and 408 are shown as hanging on various virtual hooks. Each virtual good is associated with a label indicating, at least, the status and title of the virtual good. For example, the virtual good 402 is associated with a label including a checkmark 403. This may indicate that the virtual good 402 has been previously purchased by the user. In one embodiment, the checkmark 403 may be "animated" into the label upon purchase of the virtual good by a user. In contrast, the virtual good 404 is associated with a label including a ribbon 405 in its upper right hand corner. This may indicate that the virtual good 404 has not yet been purchased by the user. In the example of FIG. 4, the sensor information obtained by the user device 202 indicates that there has been no change in velocity with respect to each of the x axis, y axis, and z axis. Thus, the virtual goods shown in FIG. 4 are shown as being oriented in a vertical position relative to the display of the user device 202.

Figure 5:
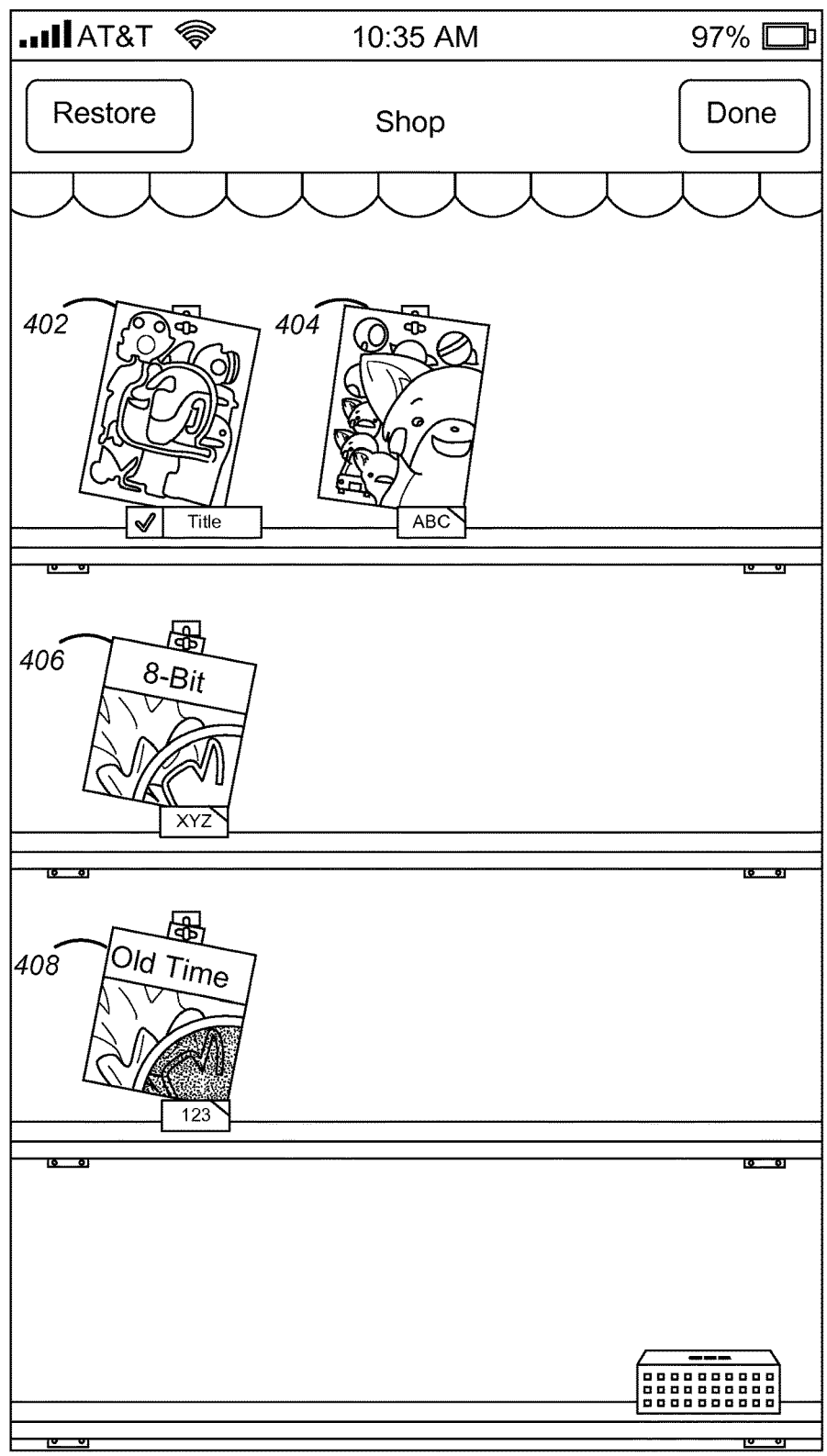
FIG. 5 illustrates another example embodiment of a graphical user interface.
Figure 6:
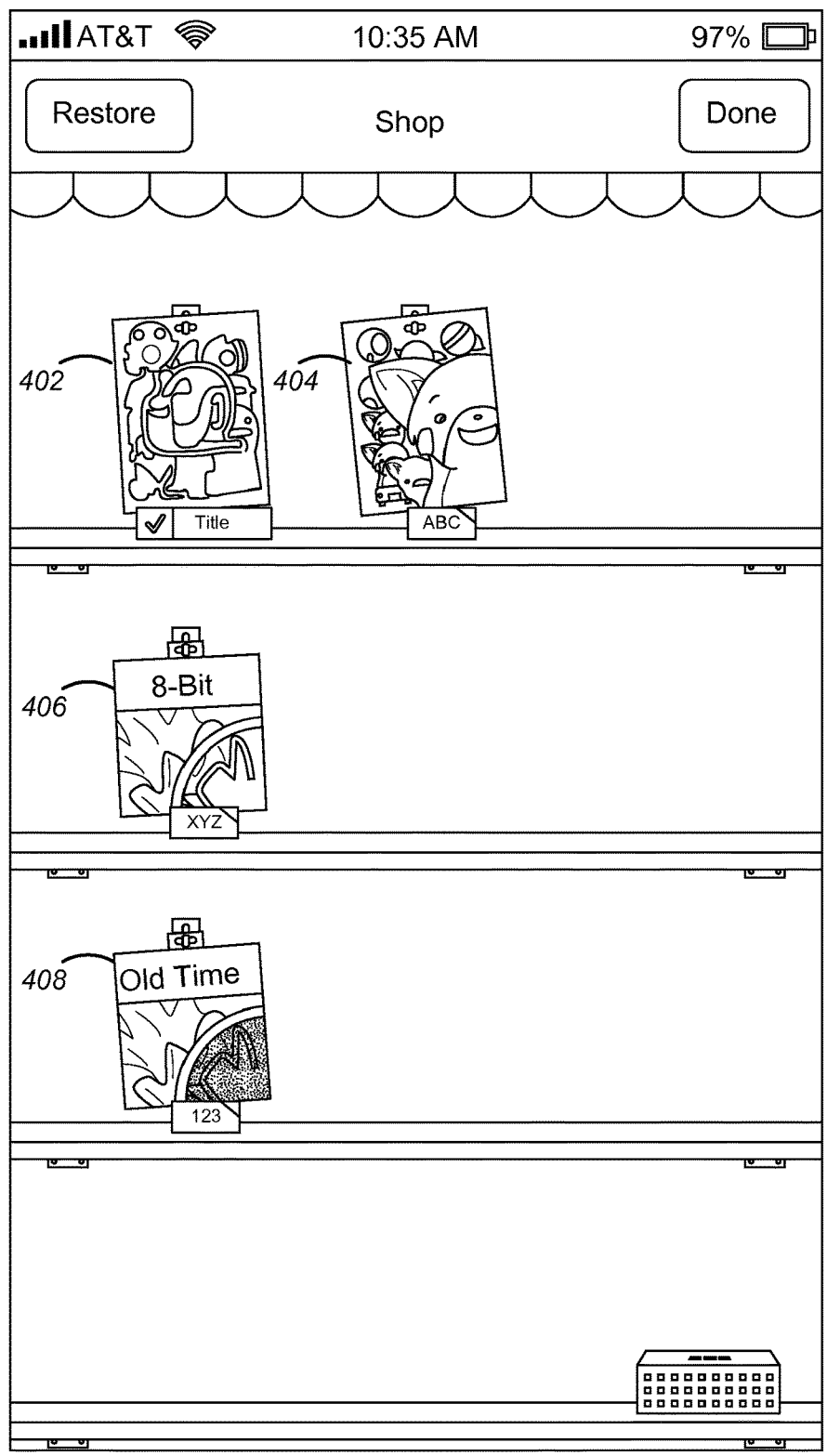
FIG. 6 illustrates yet another example embodiment of a graphical user interface.

During operation, the virtual shop application receives additional sensor information from the sensors at a rate of 60 HZ, for example, as described with respect to FIG. 3. Based on the additional sensor information, the virtual shop application updates the virtual goods in the display in order to simulate the effects of physical phenomenon on the virtual goods. Referring to FIGS. 5 and 6, together they illustrate graphical user interfaces with different orientations of the virtual goods responsive to additional sensor information. In particular, FIGS. 5 and 6 show examples of our virtual goods rotated with respect to the different hooks responsive to changes in the velocity of the user device 202. In FIG. 5, the virtual goods are tilted to the left relative to the display. In FIG. 6, the virtual goods are tilted to the right relative to the display. As shown, the labels and/or other icons associated with the virtual goods remain fixed relative to the display.

Additional Configuration Considerations

An advantage of the configurations as disclosed is improving in the user experience of a virtual shop of a social networking system by simulating physics. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 and 2. Modules may constitute either software modules (e.g., instructions or code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for simulating physics in a virtual shop through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for simulating physics in a graphical user interface of a mobile display device, comprising:
    receiving, by the mobile display device, a request to access a virtual shop associated with a social networking system;
    obtaining, by the mobile display device, virtual good data from the social networking system, the virtual good data indicating virtual goods available for purchase from the social networking system;
    identifying, by the mobile display device, first sensor information from one or more sensors of the mobile display device, the first sensor information including at least first acceleration data for the mobile display device;
    displaying, by the mobile display device, virtual goods on a display of the mobile display device with respect to orientation points associated with fixed virtual hooks respectively, in the virtual shop, wherein displaying the virtual goods with respect to the orientation points is based on the first sensor information, the virtual goods are displayed as hanging on the virtual hooks, and each of the virtual goods is associated with a different orientation point having a specific set of coordinates associated with the display;
    identifying, by the mobile display device, second sensor information from the one or more sensors, the one or more sensors including an accelerometer sensor, the second sensor information including at least second acceleration data for the mobile display device, the second sensor information generated after the first sensor information; and
    simulating, by the mobile display device on the display, rotational movements of the virtual goods with respect to the orientation points,
    wherein simulating the rotational movements comprises:
        determining an acceleration value based on the second sensor information, the acceleration value indicative of acceleration of the mobile display device along an axis on the specific set of coordinates associated with the display;
        calculating each of orientation angles for the virtual goods based on the acceleration value and a position of a corresponding virtual good among the virtual goods on the display of the mobile display device such that a first calculated orientation angle for a first virtual good with respect to a first orientation point among the virtual goods is determined to be different from a second calculated orientation angle for a second virtual good with respect to a second orientation point among the virtual goods; and
    rotating the virtual goods with respect to the orientation points based on the calculated orientation angles in substantially real-time, respectively.

2. The method of claim 1, simulating the rotational movements further comprises:
    changing the positions of the virtual goods on the display with respect to the virtual hooks from first positions to second positions, wherein the positions change based on the calculated orientation angles.

3. The method of claim 2, wherein the second sensor information comprises a plurality of acceleration samples captured by the one or more sensors.

4. The method of claim 3, wherein the acceleration value is an average of the plurality of acceleration samples.

5. The method of claim 3, wherein the acceleration value is a weighted average of the plurality of acceleration samples,
    wherein a first acceleration sample among the plurality of acceleration samples is given more weight than a second acceleration sample among the plurality of acceleration samples, and the first acceleration sample is generated after the second acceleration sample.

6. The method of claim 2, wherein the orientation angles are calculated responsive to the acceleration value being greater than a threshold value.

7. The method of claim 1, wherein a first orientation angle for a first virtual good in an outer column among the virtual goods is determined to be greater than a second orientation angle for a second virtual good in an inner column among the virtual goods.

8. A method for simulating movement of virtual items on a mobile display device, comprising:
    receiving, by the mobile display device, a request to access a virtual shop associated with a social networking system;
    obtaining, by the mobile display device, virtual item data from the social networking system, the virtual item data indicating the virtual items available for purchase from the social networking system;
    displaying, by the mobile display device, on a display of the mobile display device, in the virtual shop, the virtual items;
    identifying, by the mobile display device, sensor information generated by one or more sensors of the mobile display device, the one or more sensors including an accelerometer sensor, the sensor information indicating movement of the mobile display device;
    determining an acceleration value based on the sensor information, the acceleration value indicative of acceleration of the mobile display device along an axis on a specific set of coordinates associated with the display;
    calculating each of orientation angles for the virtual items based on the acceleration value and a position of a corresponding virtual item among the virtual items on the display of the mobile display device such that a first calculated orientation angle for a first virtual item with respect to a first orientation point among the virtual items is determined to be different from a second calculated orientation angle for a second virtual item with respect to a second orientation point among the virtual items; and simulating, by the mobile display device, on the display, movements of the virtual items with respect to orientation points based on the calculated orientation angles, wherein simulating the movements comprises:

moving the virtual items with respect to orientation points based on the calculated orientation angles corresponding to the virtual items in substantially real-time, respectively.

9. The method of claim 8, wherein the virtual item is an item available for purchase from a social networking system.

10. The method of claim 8, wherein simulating the movements further comprises rotating the virtual items around the orientation points.

11. The method of claim 8, simulating the movements further comprises:

changing positions of the virtual items on the display with respect to the orientation points from first positions to second positions, wherein the positions change based on the calculated orientation angles.

12. The method of claim 11, wherein the sensor information comprises a plurality of acceleration samples captured by the one or more sensors.

13. The method of claim 12, wherein the acceleration value is an average of the plurality of acceleration samples.

14. The method of claim 12, wherein the acceleration value is a weighted average of the plurality of acceleration samples, wherein a first acceleration sample among the plurality of acceleration samples is given more weight than a second acceleration sample among the plurality of acceleration samples, and the first acceleration sample is generated after the second acceleration sample.

15. The method of claim 11, wherein the orientation angles are calculated responsive to the acceleration value being greater than a threshold value.

16. A method for simulating physics in a graphical user interface of a mobile display device with an accelerometer sensor, comprising:

receiving, by the mobile display device, a request to access a virtual shop associated with a social networking system;

obtaining, by the mobile display device, virtual item data from the social networking system, the virtual item data indicating virtual items available for purchase from the social networking system;

displaying, by the mobile display device on a display, virtual items in the virtual shop, wherein the virtual items are displayed with respect to orientation points associated with fixed virtual hooks, and each of the virtual items is associated with a different orientation point having a specific set of coordinates associated with the display;

identifying, by the mobile display device, sensor information generated by one or more sensors, the one or more sensors including the accelerometer sensor, the sensor information indicating movement of the mobile display device;

determining an acceleration value based on the sensor information, the acceleration value indicative of acceleration of the mobile display device along an axis on the specific set of coordinates associated with the display;

calculating each of orientation angles for the virtual items based on the acceleration value and a position of a corresponding virtual item among the virtual items on the display of the mobile display device such that a first calculated orientation angle for a first virtual item with respect to a first orientation point among the virtual items is determined to be different from a second calculated orientation angle for a second virtual item with respect to a second orientation point among the virtual items; and simulating, by the mobile display device, on the display, movements of the virtual items with respect to orientation points based on the calculated orientation angles, wherein simulating the movements comprises:

moving the virtual items with respect to the orientation points based on the calculated orientation angles in substantially real-time, respectively.

17. The method of claim 16, wherein the virtual item is an item available for purchase from a social networking system.

18. The method of claim 16, wherein simulating the movements further comprise rotating the virtual items around the orientation points.

19. The method of claim 16, wherein the sensor information comprises a plurality of acceleration samples captured by the one or more sensors.

20. The method of claim 16, simulating movement comprises:

changing positions of the virtual items on the display with respect to the orientation points from first positions to second positions, wherein the positions change based on the calculated orientation angles.

21. The method of claim 20, wherein the orientation angles are calculated responsive to the acceleration value being greater than a threshold value.

* * * * *